United States Patent
Luken et al.

(10) Patent No.: US 6,988,144 B1
(45) Date of Patent: Jan. 17, 2006

(54) PACKET SCHEDULING SYSTEM AND METHOD FOR MULTIMEDIA DATA

(75) Inventors: William L. Luken, Yorktown Heights, NY (US); Stephen P. Wood, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 09/663,490

(22) Filed: Sep. 18, 2000

Related U.S. Application Data

(60) Provisional application No. 60/166,302, filed on Nov. 18, 1999.

(51) Int. Cl.
*G06F 13/38* (2006.01)

(52) U.S. Cl. .................. 709/231; 709/236; 709/224; 370/510

(58) Field of Classification Search .............. 709/224, 709/236, 231, 105, 220, 225, 226, 228, 232, 709/203; 370/477, 510, 229, 230, 233, 235, 370/253, 395.42, 236; 475/240; 375/225, 375/240

See application file for complete search history.

(56) References Cited

U.S. PATENT DOCUMENTS

| | | | | |
|---|---|---|---|---|
| 4,730,348 A | * | 3/1988 | MacCrisken | ................ 375/240 |
| 5,802,106 A | * | 9/1998 | Packer | ........................ 375/225 |
| 5,822,524 A | * | 10/1998 | Chen et al. | ................. 709/203 |
| 5,951,646 A | * | 9/1999 | Brandon | ...................... 709/231 |
| 5,953,318 A | * | 9/1999 | Nattkemper et al. | ......... 370/236 |
| 6,359,900 B1 | * | 3/2002 | Dinakar et al. | ............. 370/458 |
| 6,427,063 B1 | * | 7/2002 | Cook et al. | ................. 434/350 |
| 6,463,454 B1 | * | 10/2002 | Lumelsky et al. | ........... 709/105 |
| 6,469,982 B1 | * | 10/2002 | Henrion et al. | ............. 370/230 |
| 6,577,635 B2 | * | 6/2003 | Narayana et al. | ...... 370/395.42 |
| 6,578,068 B1 | * | 6/2003 | Bowman-Amuah | ......... 709/203 |
| 6,618,391 B1 | * | 9/2003 | Chiussi et al. | .............. 370/418 |

* cited by examiner

*Primary Examiner*—Zarni Maung
*Assistant Examiner*—Khanh Quang Dinh
(74) *Attorney, Agent, or Firm*—Douglas W. Cameron; Anne V. Dougherty

(57) ABSTRACT

A method for scheduling the delivery of multimedia data packets over a communications medium with a limited bandwidth. The packets may contain data representing images, sounds, or other media which are to be delivered from a source or server to a recipient or client. The 6 method described here minimizes the delay between the point in time when a client requests the multimedia data and the point in time when the client may start presenting the data without risk of interruption, for a given communications bandwidth. This method also determines the minimum buffer sizes needed by the client in order to present this multimedia data subject to the specified bandwidth limit.

24 Claims, 7 Drawing Sheets

PACKET SCHEDULING SYSTEM AND METHOD FOR MULTIMEDIA DATA

This Application claims the benefit of U.S. Provisional 60/166,302 filed Nov. 18, 1999.

FIELD OF THE INVENTION

The invention relates generally to the communication of multimedia data and more particularly to optimizing the delivery of multimedia data streams to allow uninterrupted display at a client.

BACKGROUND OF THE INVENTION

There is a need to facilitate the transfer of media data from a Media Server to a Media client in a system such as that shown in FIG. 1. The Media Server (100) and Media Client (135) are both computers with memory, mass storage, and processors capable of running various types of software. The Media Server (100) includes a Media Database (195) which contains various types of media data including images, audio data, video data, and so forth. The Media Server (100) also includes suitable Media Delivery Means (110) such as software capable of reading media data from the Media Database (105) and transferring this data to the Media Client (135), by means of, for example, a Local Area Network (115), the Internet (120), an Internet Service Provider (125), and a dial-up telephone connection (130).

The Media Client (135) includes memory that may be used to form media buffers (140) for receiving media data originating from the Media Server (100). The Media Client (135) also includes various Media Players (143 and 145) which provide means for presenting visual media in windows on a display screen (144), and presenting audio data on speakers or other audio output hardware (142).

The media data contained within the Media Database (105) may have the form of various media data files. One example of a media data file is an MPEG-4 file as defined by the ISO standards document ISO/IEC JTC/SC29/WG11 14496-1 (MPEG4 Systems). The structure of such an MPEG-4 file is briefly summarized in FIG. 2.

As shown in FIG. 2, an MPEG-4 file contains one or more media data blocks (200a–200n), each representing a particular media "track" such as a still image, an audio stream, a sequence of images forming a video stream, etc. In addition, an MPEG-4 file also contains a media descriptor (210) comprised of a media header (220) and a sequence of track descriptors (230a–230n), one for each of the media data blocks, (200a–200n).

The media header (220) specifies in formation common to all of a particular kind of media track, including the overall duration of the media file, and a time/date stamp indicating when the file was created. For more details of the media header, see the aforementioned ISO standards document ISO/IEC JTC/SC29/WG11 14496-1.

As shown in FIG. 3, each media a data block (300) is composed of a sequence of media chunks (310a–310n). Each media chunk (310a–310n) consists of a sequence of media samples (320a–320n, 321a–321n, and 322a–322n). Each media sample represents a block of media data associated with a particular point in time. The corresponding track descriptors (230a–230n of FIG. 2) include various tables (not shown) which specify the location and size, in number of bytes, of each media chunk and of each media sample. These tables also specify the point in time at which each media sample is to be presented, and the duration or length of time that the media data of the media sample is to be presented. In the case of visual data, the track descriptor also specifies the dimensions (height and width) of the images contained in the media data block. Detailed descriptions of these tables can be found in the aforementioned MPEG-4 file specifications, (ISO/IEC JTC/SC29/WG11 14496-1).

A file with the structure described in FIG. 2 and FIG. 3 provides an efficient means of storing multimedia data, but this form is poorly suited for transferring this data from a server to a client over a communications medium with a limited bandwidth. Because this file is organized by media tracks, rather than on a temporal basis, the client cannot begin to present any of the data contained in such a file until the entire file has been transferred from the server to the client. This can result in a very long delay between the point in time when a client requests the data and the point in time when the client is able to start presenting the media data.

The time interval between the point in time when a client requests the media data and the point when the client can begin to present the data without risk of interruption is called the "initial delay." In the worst case, the initial delay is given by Delay (worst)=(file size in bytes)/(bandwidth in bytes per second)

where "bandwidth" is a property of the communications path from the server to the client. When the communications path from the server to the client requires multiple steps, as shown in FIG. 1, the "bandwidth" value is determined by the minimum bandwidth for all of the steps.

It is therefore and object of this invention is to determine an optimal ordering of a set of multimedia data packets, the resulting optimal initial delay, and the minimum sizes of all client data buffers, given an arbitrary set of multimedia data streams, a maximum packet size, and a communications bandwidth limit.

SUMMARY OF THE INVENTION

The foregoing and other objectives are realized by the present invention wherein one or a plurality of components execute the steps for extracting media data from server-based media data files and reorganizing the data in order to deliver temporally-ordered multimedia data streams in such a way that the client can begin presenting received data prior to receipt of all of the information. The reorganization process requires analysis of the data to be delivered, the bandwidth limitations of the communications link, and the client buffering capabilities.

BRIEF DESCRIPTION OF THE DRAWINGS

The invention will now be described with specific reference to the appended drawings wherein.

DETAILED DESCRIPTION OF THE INVENTION

Figure 4:
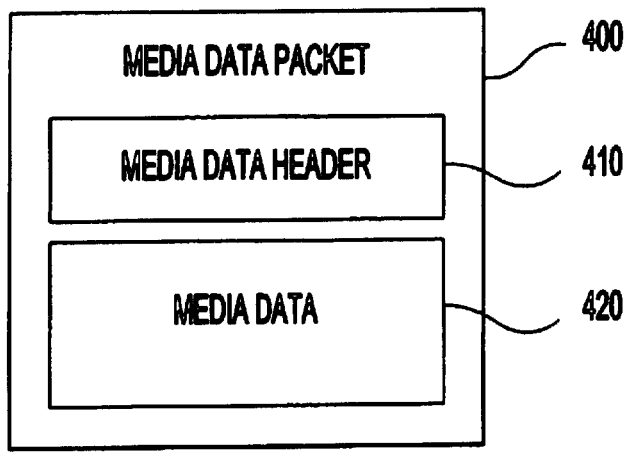
FIG. 4 is a schematic representation of a Media Data Packet in accordance with the present invention.

The objective of this invention is to extract the media data from the data file, reorganize this data, and deliver the reorganized data to the client so as to minimize the initial delay for a given bandwidth. In order to accomplish this objective, the data contained in the media data blocks will be converted into a sequence of media data packets with the structure shown in FIG. 4. with each media data packet (400) consisting of a media data header (410) and a media data (420). The media data header (410) identifies which track is associated with this packet (trackID), the size of the packet, a time stamp indicating when the data in this packet is to be presented, an indication of whether this packet is the last packet associated with a particular sample (eg. 320*a*), and an indication of whether this is the last packet of an entire media track (200*n*). In order to provide the optimal ordering of packets, optimal delay, and optimal buffer allocation, the Media Server (100) is provided with the capability and components, preferably in the Media Delivery Means, of the present invention, including creating a list of virtual data packets representative of all data packets to be scheduled for delivery from the server to the client; calculating a delivery deadline for each virtual data packet based on the communications bandwidth from the server to the client; sorting the list of virtual data packets based on the delivery deadlines calculated for each virtual data packet, to provide a sorted list; and delivering the data packets in accordance with the sorted list.

One important consideration is to minimize the size of the media data header because a large media data header consumes bandwidth and increases the resulting initial delay. In a first preferred embodiment of the invention, therefore, the media data header may consist of 16 bytes including:

(a) 4 bytes for the media data packet size, (b) 4 bytes for a time stamp indicating when the media data is to be presented, (c) 4 bytes specifying the number of bytes until the next packet in this track (or −1 for the last packet of a track), (d) one byte for a track ID, and (e) three remaining bytes.

The remaining three bytes include one bit to indicate whether this media data packet is the last packet for a media sample. The remaining 23 bits are unused by the particular first embodiment of the invention. In alternative embodiments of this invention, the size of the media data header (410) may be larger or smaller than the size (16 bytes) used in this example. Furthermore, the ordering of the data values included within the media data header is not important and may vary from the above order without affecting the effectiveness of the invention.

Figure 1:
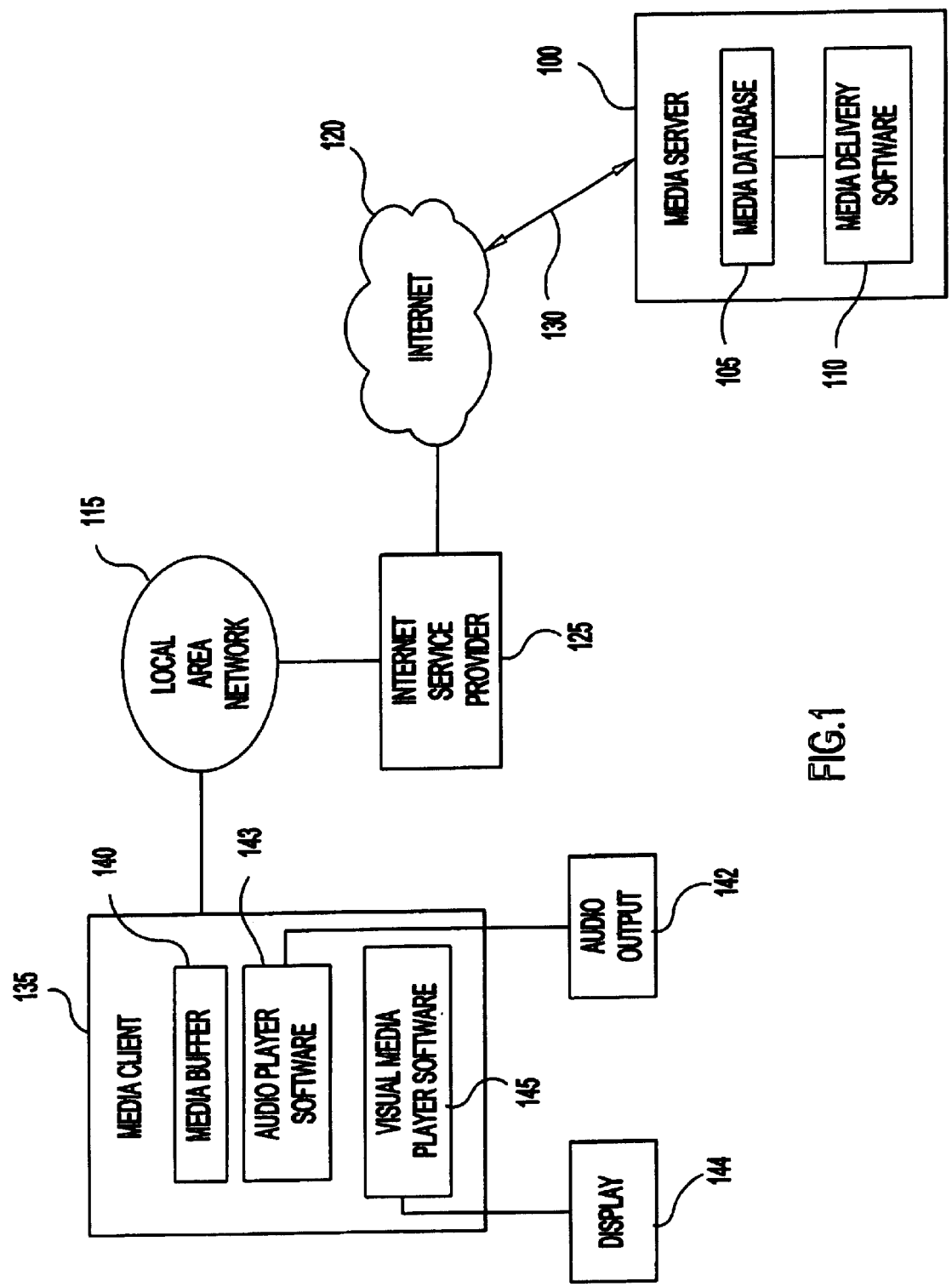
FIG. 1 provides a schematic representation of a prior art client-sever environment suitable for implementing the present invention.
Figure 2:
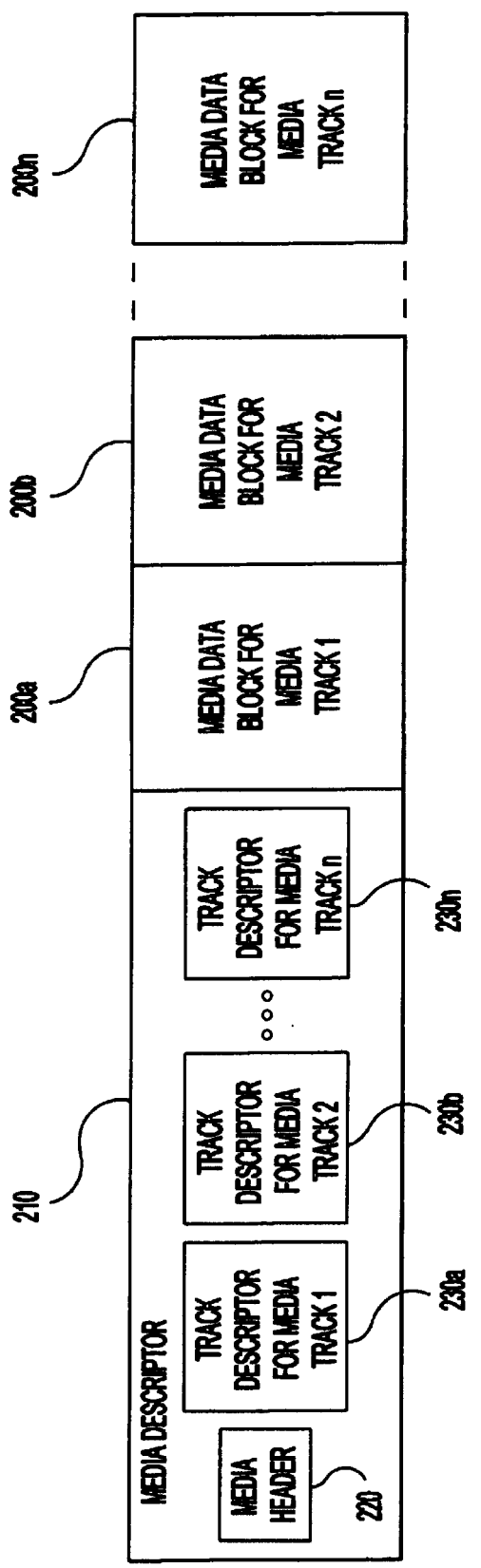
FIG. 2 provides a schematic representation of the structure of an MPEG-4 file.
Figure 3:
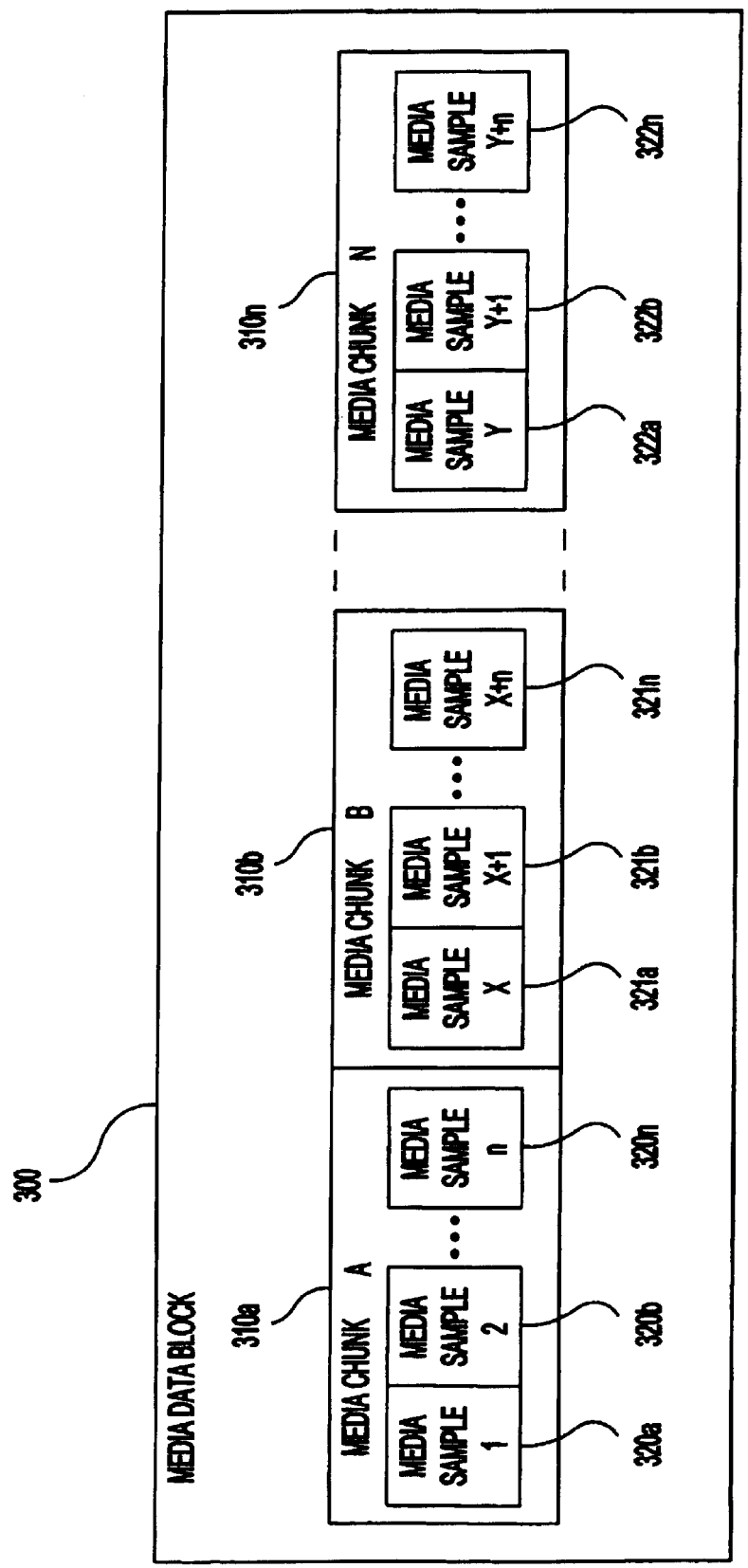
FIG. 3 is a schematic of a media data block within an MPEG-4 file.

The media data portion (420) of a media data packet (400) may contain all or part of a single media sample (eg. 320*a* of FIG. 3). In order to facilitate the transfer of the data packets over the communications pathway, it may be necessary or beneficial to limit the maximum size of an individual media data packet. Accordingly, if the size of a media sample (eg. 320*a* of FIG. 3) plus the media data header (410) exceeds the maximum media data packet size, then the media sample may be divided across multiple data packets (as, for example, 320*a*1, 320*a*2 . . . 320*a*n).

In some cases, such as for audio media data, it may also be possible to merge multiple small media samples into a single larger media sample. This may be accomplished by replacing a sequence of media samples (S1, S2, S3, . . . ) having starting times of (t1, t2, t3, . . . ), durations (d1, d2, d3, . . . ), and sizes (s1, s2, s3, . . . ) with a single media sample S with start time t=t1, duration d=d1+d2+d3+. . . And size s=s1+s2+s3++. . . Such merging of media samples may be performed whenever possible, subject to the maximum media packet size.

In addition to the media data packets (400), the data delivered from the server to the client also includes data handling packets, including track definition and track initialization packets (not shown), to define and initialize media handlers for each media track. These track definition packets and track initialization packets specify what kind of data is contained in each media track (audio, video, still images, etc.), and any other information required to prepare the client to present the media data. This may include specification of audio or video codecs, height and width windows used to present image data, start time and duration information, client buffer size requirements, etc. The precise organization of these packets is not critical to the invention. This invention is primarily concerned with the sizes of data handling packets and the need to deliver the packets before delivering any of the media data packets for each media track. In one implementation of this invention, the information in the track definition and track initialization packets together required a total of 126 bytes per track.

In addition, each sequence of packets delivered from the server to the client includes a set of initial packets (not shown) to prepare the client for receipt of the remaining packets. These include a data stream header packet and data stream initialization packets which precede the data handling packets. As with the track definition and track initialization data handling packets, this invention is not concerned with the detailed arrangement of data in these packets. This invention needs only the total size of the packets, which representatively came to a total of 223 bytes in one sample implementation.

Figure 5:
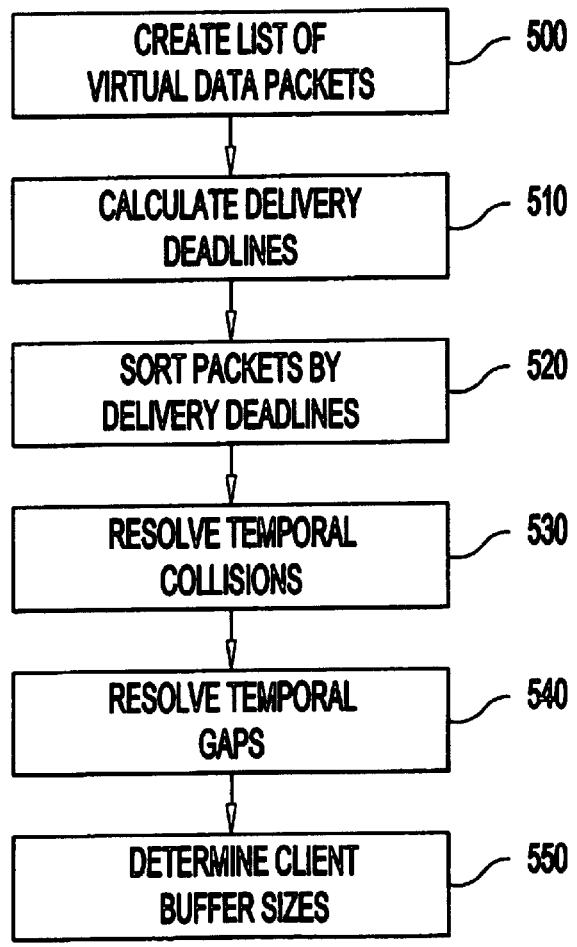
FIG. 5 is a representative process flow for implementing the present invention.

The invention operates by simulating the entire data transfer process from beginning to end before transferring any data. The result of this simulation is an ordering of media data packets, thereby yielding the minimal initial delay. In addition, the simulation also arrives at a value for the minimal sizes of all data buffers required by the client. The simulated data transfer is accomplished through the six steps which are shown in FIG. 5 and explained in more detail below.

The six steps are based on a list of "virtual data packets," which is created at step 500, as further detailed below. Each virtual data packet represents exactly one of the actual media data packets (400) ultimately delivered from the server to the client. Each virtual data packet includes the following information:

(a) iTrack: the track number for the media data block (200,300) containing the media data for the packet, (b) iChunk: the index of the media chunk (310) containing the media data for the packet, (c) iSample: an integer sequentially enumerating each of the media samples (320) contained within a media data block (200,300), (d) bEndOfSample: a Boolean flag (true or false) indicating whether this packet is the last packet derived from a particular media sample (320), (e) bEndOfTrack: a Boolean flag (true or false) indicating whether this packet is the last packet derived from a particular media track (230), (f) iOffset: the address within a media data block (200, 300) of the first byte of the media data represented by this packet.

(g) iPacketSize: the number of bytes in the media data packet (400), including the media data header (410), represented by this virtual data packet, (h) iBufferSize: the number of bytes of data in the media data portion (420) of this packet, (i) t0: the point in time when a player should begin to present the data found in the sample which includes the data in this packet, (j) t1: the point in time when a player should stop presenting the data found in the sample which includes the data in this packet (t0 plus the sample duration), (k) t2: the delivery deadline, indicating the last possible moment in time that the server can start to deliver this packet so that it arrives at the client by t0, (l) t3: the point in time that the server must begin to deliver this packet without interference between this packet and subsequent packets, (m) t4: the point in time when the server will finish the delivery of this packet, (n) an array of buffer size values, iSize[iNumTracks], where iNumTracks is the number of media tracks (230) in the media data file (200).

All time values are specified in media time units defined by the media header (220). The values of t0 and t1 may be represented as integers. The remaining time values (t2 . . . t4) may be represented as either floating point values or fixed point values. In the current embodiment, these values were represented as fixed point values with eight-bit fractions.

The specific steps of the FIG. 5 will now be detailed. First, a list of virtual data packets is created at step (500). This step is accomplished by traversing each of the track descriptors (230) to create a complete list of virtual data packets. The values of iTrack, iChunk, iSample, bEndOfSample, bEndOfTrack, iOffset, iPacketSize, iBufferSize, t0, and t1 are all determined in this step. The remaining values in each virtual packet are determined in subsequent steps.

The virtual data packet list step may be summarized with the following procedure:

I. Determine the number of media tracks, iNumTracks, in the media data file.
II. Set iPacket to zero.
III. Loop over (i.e. select each in turn) all media tracks. For each track (iTrack=1 to iNumTracks):
   1. Set iSample to zero.
   2. Determine the starting time for presentation of the data in this track (iTime).
   3. Determine the number of media chunks in the media data block (iNumChunks).
   4. Loop over media chunks. For each media chunk (iChunk):
      A. Determine the address of the chunk within the media data block (iOffset).
      B. Determine the number of media samples in this chunk (iNumSamples).
      C. Loop over media samples. For each media sample:
         a. Determine the size of the media sample (iSize).
         b. Determine the temporal duration (t.duration) for the media sample.
         c. Set t.start to iTime and t.end to iTime+t.duration.
         d. If the size of the media sample (iSize) plus the size of the media data header (iHeaderSize) exceeds the maximum packet size (iMaxPacketSize), repeat the following until iSize is less than iMaxPacketSize:
            d1. Create a new virtual data packet, Packet [iPacket].
            d2. Set Packet.iTrack=iTrack.
            d3. Set Packet.iChunk=iChunk.
            d4. Set Packet.iSample=iSample.
            d5. Set Packet.bEndOfSample=false.
            d6. Set Packet.bEndOfTrack=false.
            d7. Set Packet.iOffset=iOffset.
            d8. Set Packet.iPacketSize=iMaxPacketSize.
            d9. Set Packet.iBufferSize=iMaxPacketSize−iHeaderSize.
            d10. Set Packet.t0=t.start.
            d11. Set Packet.t1=t.end.
            d12. Set iOffset=iOffset+Packet.iBufferSize.
            d13. Set iSize=iSize−Packet.iBufferSize.
            d14. Increment iPacket by 1.
         e. Create a new virtual data packet, Packet [iPacket].
         f. Set Packet.iTrack=iTrack.
         g. Set Packet.iChunk=iChunk.
         h. Set Packet.iSample=iSample.
         i. Set Packet.bEndOfSample=true.
         j. Set Packet.bEndOfTrack=false.
         k. Set Packet.iOffset=iOffset.
         l. Set Packet.iPacketSize=iSize+iHeaderSize.
         m. Set Packet.iBufferSize=iSize.
         n. Set Packet.t0=tstart.
         o. Set Packet.t1=t.end.
         p. Set iOffset=iOffset+iSize.
         q. Increment iPacket by 1.
         r. Increment iSample by 1.
         s. Set iTime=t.end.
         t. (end of loop over samples in this chunk)
      (end of loop over chunks in this media track)
   5. Set packet.bEndOfTrack=true for the last packet, Packet[iPacket−1].
6. (end of loop over media tracks)
IV. Set iNumPackets, the total number of media data packets, to iPacket.

The resulting values of t0 and t1 for all virtual data packets are all positive or zero, with t0 0 representing the first virtual data packet of the first track to start. Multiple tracks may all start with t0=0. Within each track, values of t0 increase monastically as a function of the virtual packet index (iPacket), and t0 of each virtual data packet equals t1 of the preceding virtual data packet, except that all virtual data packets derived from the same media sample share the same values of t0 and t1.

In the step at (510) of FIG. 5, delivery deadlines are calculated. The delivery deadline is defined as the last possible time at which the transfer of a media data packet from the server to the client must begin in order for the complete media data packet to arrive at the client before it is needed. This time is determined by the packet start time minus the packet size divided by the data transfer bandwidth. That is, $$t(\text{deadline}) = t(\text{start}) - (\text{packet size})/(\text{bandwidth}).$$

Values of t(deadline) may be negative, especially for the initial packets with t(start)=0. The negative values of t(deadline) imply contributions to the initial delay.

The deadline calculation is accomplished by performing a loop over all virtual data packets in the list of virtual data packets created in step (500). For each virtual data packet (iPacket=1 to iNumPackets), the value of t2 represents the packet delivery deadline. This value is determined by:

$$T2(iPacket)=t0(iPacket)-iPacketSize(iPacket)/(bandwidth)$$

This simple calculation could easily be performed as part of step (500), but this has been shown as a separate step in this embodiment due to the fact that the calculation depends on the choice of a value for the bandwidth. The operations in step (500) do not depend on the bandwidth value, and completely do not need to be repeated in response to changes in the value of the bandwidth.

Figure 6:
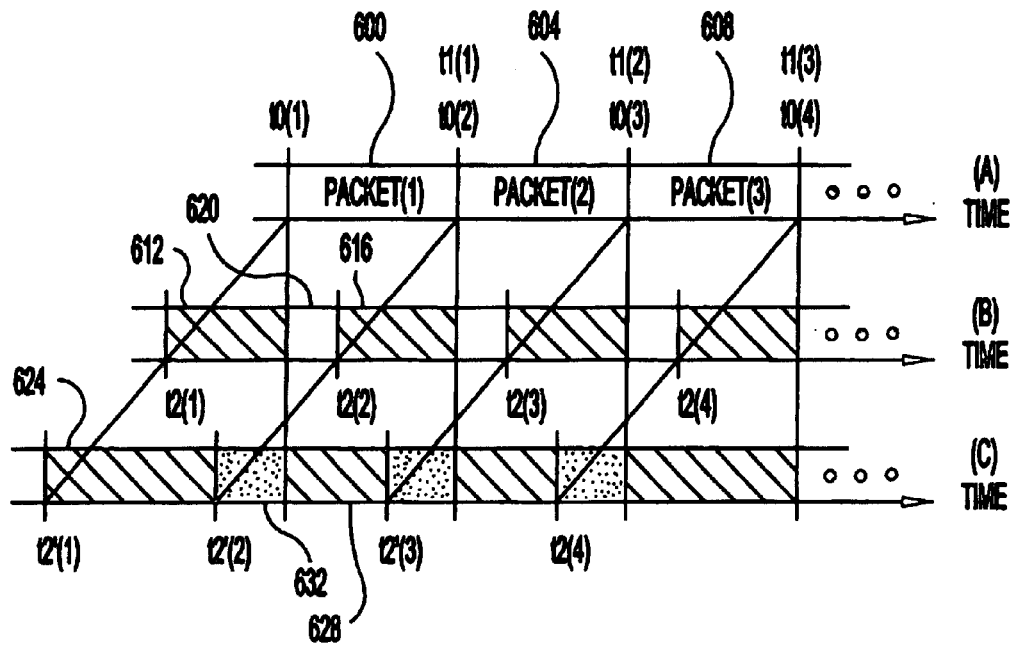
FIG. 6 provides a first temporally-defined schematic diagram for delivery of related media packets.

The results of the deadline calculation are illustrated in FIG. 6. Part (A) of FIG. 6 shows three consecutive media data packets forming part of one media track (200). Media data packet Packet(1) (600) is scheduled for presentation from time t0(1) to time t1(1). The next media data packet (604) is scheduled for presentation from t0(2) to t1(2), and so forth.

Part (B) of FIG. 6 illustrates the values of t2(i) for a high bandwidth condition. In this example, the data for the first packet (600) must be delivered no later than time t2(1) in order to reach the client by time t0(1). The interval (612) from t2(1) to t0(1) represents the period during which the communications channel (115–130) may be occupied by the task of delivering the data for Packet(1). Likewise, the interval (616) from t2(2) to t0(2) represents the period during which the communications channel (115–130) may be occupied by the task of delivering the data for Packet(2). In this case, the size of the interval (616) is smaller than the duration (t1(1)–t0(1)) of the presentation of the preceding packet (600), resulting in a gap (620) between the end of the delivery of Packet(1) (600) at t0(1) and the start of the delivery of Packet(2) (604) at t2(2).

Part (C) of FIG. 6 illustrates the values of t2(i) for a low bandwidth condition. In this example, the data for the first packet (600) must be delivered no later than time t2'(1) in order to reach the client by time t0(1). The interval (624) from t2'(1) to t0(1) represents the period during which the communications channel (115–130) may be occupied by the task of delivering the data for Packet(1). Likewise, the interval (628) from t2'(2) to t0(2) represents the period during which the communications channel (115–130) may be occupied by the task of delivering the data for Packet(2). In this case, the size of this interval (628) is greater than the duration (t1(1)–t0(1)) of the presentation of the preceding packet (600), resulting in an overlap (632) between the start of the delivery of Packet(2) (604) at t2'(2) and the end of the delivery of Packet(1) (600) at t0(1). Overlapping intervals such as these imply a temporal collision because the communications channel can only handle one packet at a time. Means for resolving these collisions are presented in step 530.

At step 520, all packets are sorted by deadline. In this step, the list of virtual data packets created in step (500) is sorted on the basis of the values of t2 determined in step (510), subject to the constraint that all virtual data packets for a given media track must remain in the original order determined by step (510).

Figure 7:
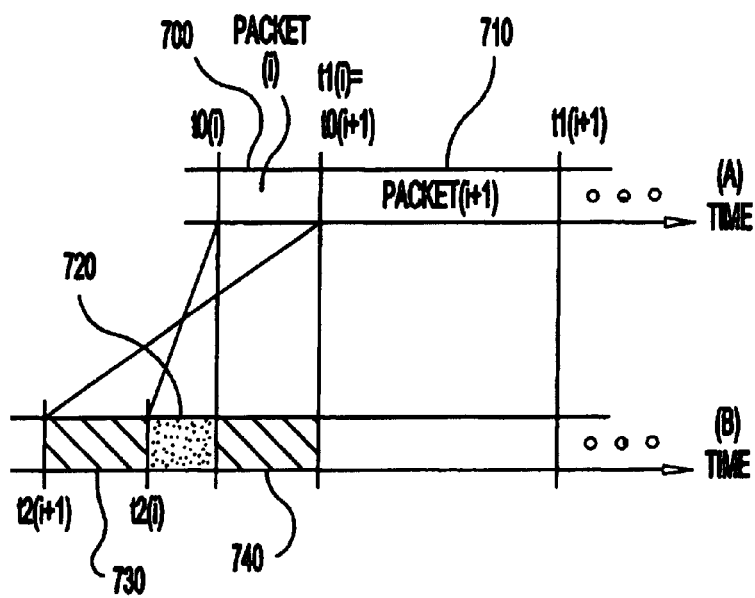
FIG. 7 illustrates a second temporally-defined schematic diagram for delivery of media packets.

The ordering of packets within a given media track becomes an issue when one data packet, with a small packet size, and possibly a short duration, is followed by a much larger data packet. This condition is illustrated in FIG. 7, where a small data packet, Packet(i) (700), is followed by Packet(i+1) (710), with a much larger size, iPacketSize((i+1)>iPacketSize(i). Because of the small size of Packets(i) (700), the interval 720 from t2(i) to t0(i) is relatively small. The large size of Packet(i+1) (710) results in a large interval (730, 720, 740) from t2(i+1) to t0(i+1). In this case, if $$iPacketSize(i+1)>iPacketSize(i)+bandwidth*(t1(i))-t0(i)),$$

Then t2(i+1) will be less than t2(i). This results in a temporal collision such as that shown in FIG. 6 at 632. Resolution of this temporal collision will require scheduling the data for Packet(i) (700) before the data for Packet(i+1) (710). As detailed below for step (530), the ordering done in step (520) of all packets will be preserved. Consequently, for step (520), it is sufficient to preserve the ordering of all packets coming from a given media track.

Temporal collisions are resolved by step (530) as detailed hereinafter. As shown in FIG. 6 and FIG. 7, it is possible to encounter temporal collisions between media data packets arising from the same media track. These collisions are resolved in this step through the calculation of the time values t3 and t4 for each virtual data packet. The values of t3 and t4 are calculated staring with the last virtual data packet and working back through each successive virtual data packet until reaching the first virtual data packet.

The values of t3 and t4 for the last virtual data packet are the same as the values of t2 and t0 for this packet. That is, $$t3(iNumPackets)=t2(iNumPackets), \text{ and}$$

$$t4(iNumPackets)=t0(iNumPackets).$$

For this packet and each successive preceding packet, Packet (i), for i=iNumPackets down to 2, the values of t3 and t4 for the preceding packet, Packet(i−1), are determined as follows:

If t0(i−1)<=t3(i), that is there is no temporal collision, then $$t3(i-1)=t2(i), \text{ and}$$

$$t4(i-1)=t0(i).$$

Otherwise, that is, in case of a temporal collision, $$t4(i-1)=t3(i), \text{ and}$$

$$t3(i-1)=t2(i-1)-t0(i-1)+t3(i).$$

Figure 8:
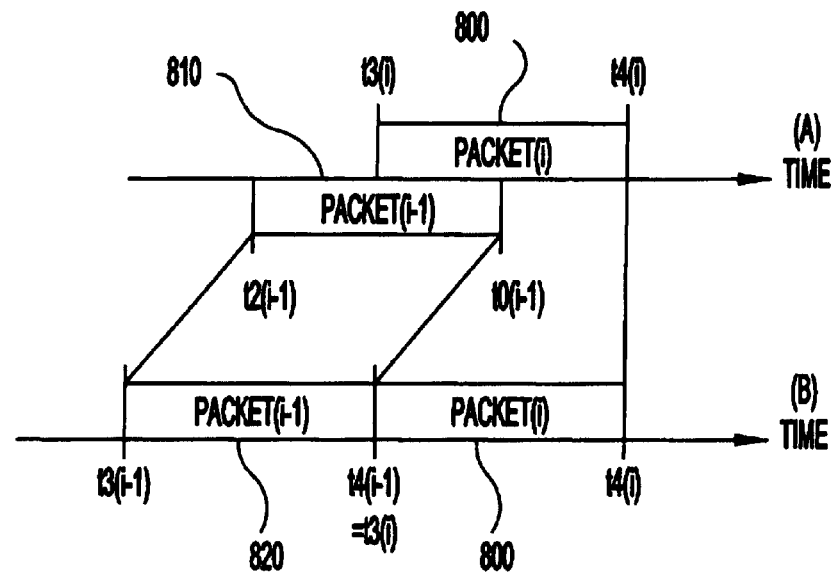
FIG. 8 illustrates a third temporally-defined schematic diagram for delivery of media packets.

This calculation is illustrated in FIG. 8 Part (A) of FIG. 8 shows a temporal collision between Packet(i) (800) and Packet(i−1) (810). The only temporal relationship between Packet(i) (800) and Packet(i−1) (810) is that t0(i−1)>t3(i). Therefore, t0(i−1) may have any relationship to t4(i), and t2(i−1) may have any relationship to t3(i) and t4(i) as long as t2(i−1)<t0(i−1).

The result of this calculation is an adjusted schedule for Packet(i−1) (820), as shown in part (B) of FIG. 8. This calculation eliminates the temporal collisions between all pairs of data packets, while preserving ordering of all packets. The resulting into t4(i)–t3(i), are the same as the intervals t0(i)–t2(i) established in Step 2, and every packet is scheduled for delivery at t3(i) on or before the delivery deadlines t2(i) established in Step 2. That is, t3(i)<=t2(i).

Although all temporal collisions have been eliminated, it is still possible to have temporal gaps between packets. These temporal gaps are treated in step (540). For the initial virtual data packet, Packet(1), the value of t0(1) is generally zero, because this is the first packet needed for the presentation. The corresponding value of t2(1) is necessarily negative because t2(i) is always less than t0(i). The value of t3(i) determined in this step must also be negative because t3(i)<=t2(i). Negating t3(1) specifies the minimal initial delay required for this presentation. That is, −t3(1) specifies the minimum time that data must be delivered from the sever to the client before the client can start presenting the media data without risk of interruption.

The resolution of temporal gaps in step (540) is now detailed with reference to FIG. 9. The sequence of virtual data packets defined by step (520) may have temporal gaps during which no packets are scheduled. These gaps arise any time where t0(i−1) is less than t3(i). Such a temporal gap is illustrated in part (A) of FIG. 9. In this case, virtual data packet, Packet(i) (900), is followed by virtual data packet, Packet(i+1) (910), with the starting time t3(i+1) being greater than ending time t4(1). Because t3(i+1)>t4(i), there is a temporary gap (920) between Packet(i) (900) and Packet(i+1) (910). The size of this temporal gap is defined by $$tgap(i+1)=t3(i+1)-t4(i).$$

These temporal gaps may be eliminated by considering each virtual data packet in sequence starting with the first virtual data packet, Packet(1). If the value of t3(i+1) for any virtual data packet Packet(i+1) is greater than the value of t4(i) for the preceding virtual data packet, Packet(i), then the delivery of Packet(i+1) may be advanced so that $$t4'(i+1)=t4(i+1)-tgap(i+1), \text{ and}$$

$$t3'(i+1)=t3(i+1)=t4(i).$$

Figure 9:
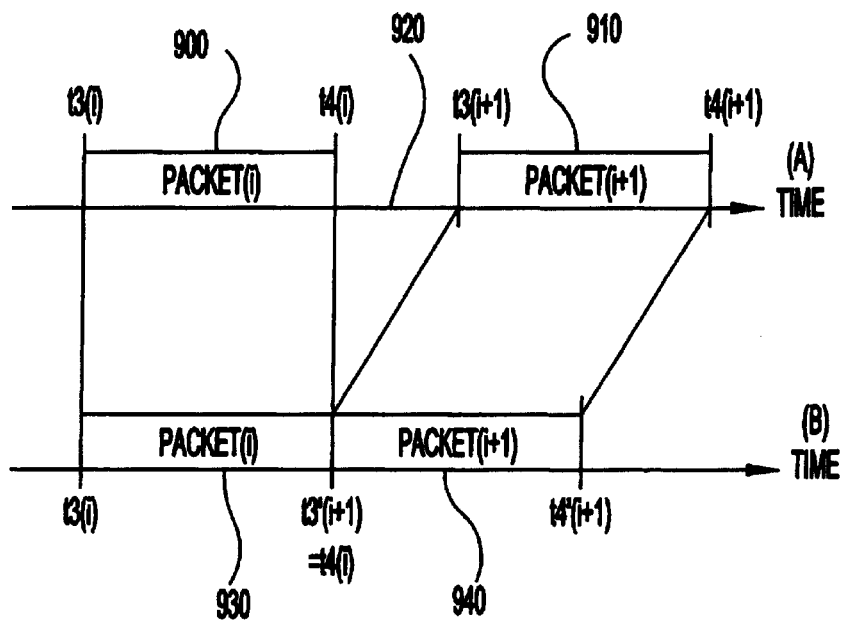
FIG. 9 illustrates a fourth temporally-defined schematic diagram for delivery of media packets.

In this case, the delivery schedule for Packet(i+1) is advanced by tgap(i+1), as shown by Packet(i) (930) and Packet(i+1) (940) in part (B) of FIG. 9.

This step has no effect on the initial delay because the first virtual data packet, including the value of t3(1), is not changed by this process. This step merely allows all subsequent packets to be delivered at the earliest possible times subject to the minimal initial delay determined earlier.

The temporal gap resolution step is optional, and may result in increase of the sizes required by the client data buffers. The necessary sizes of the client buffers, however, are determined in the next step, so there will be no danger of overflowing the client buffers. If reducing the sizes of client buffers is more important than delivering media data packets as early as possible, then the temporal gap resolution step may be skipped.

In step 550, the client buffer sizes are determined. The previous steps have determined a packet delivery sequence and a delivery time t3(i) for each virtual data packet, Packet(i). These results allow each of the corresponding (real) media data packets (400) to be delivered from the server to a client with a minimal initial delay (−t3(1)) while ensuring that each media data packet (400) reaches the client before the time t0(i) when the client needs to present the data contained in the packet.

As scheduled in the preceding steps, the real media data packet (900 of FIG. 9) associated with virtual data packet Packet(i) is transferred from the server to the client staring at time t3(i). The completed media data packet arrives at the client at time t4(i), and the client presents the data in this packet at t0(i). During the interval from time t4(i) to t0(i), the client must hold this data packet in appropriate buffer space. This buffer space can be partitioned into separate buffers for each media track (200,230).

Prior to receiving the media data packets for each track, the client needs to create the buffer that will be used to hold the media data packets from the time t4(i) when each packet arrives, until t0(i) when each packet is consumed. To enable the client to create buffers of appropriate or minimal sizes, the server needs to determine the size of each client buffer before delivering the actual media data packets. The resulting client buffer size information, BufferSize(iTrack), can be sent from the server to the client as part of a track definition block which precedes the first media data block of each track.

The server may determine the client buffer size requirements, BufferSize(Track), by simulating a set of client buffers, one for each media track, iTrack. The amount of data retained in each buffer may be simulated as a function of time, and the maximum amount of data found in each buffer as a function of time can be identified as the minimum size buffer that must be created for the corresponding media tracks.

The client buffer size calculations may be accomplished by creating an array iBufferSize2 of client buffer size values for each media track and for each virtual data packet. The value of iBufferSize2(i,iTrack) represents the state of the client buffer for media track iTrack during the interval from t3(i) to t4(i). Each time interval t3(i) to t4(i) may be considered in sequence by selecting each value of I from 1 to iNumPackets. The corresponding client buffer size values iBufferSize2(i, iTrack) are first initialized to zero for each value of iTrack from 1 to iNumTracks. Then each virtual data packet, Packet(j), may be considered in sequence for each value of j from 1 to iNumPackets.

For each virtual data packet Packet(j), if the interval of t4(j) to t0(j) overlaps the current interval t3(i) to t4(i), that is, if $$t4(j)<=t4(j) \text{ and } t0(j)>=t3(i),$$

then the value of iBufferSize(j) is added to iBufferSize(i, iTrack(j)). After completing the selection of each value of i from 1 to iNumPackets and each value of j from 1 to iNumPackets, the minimum client buffer size for each media track iTrack may be determined as the maximum value of iBufferSize2(i, iTrack) for i=1 to iNumPackets. As noted above, the buffer size is communicated to the client prior to delivery of the first media block of the tracks.

Figure 10:
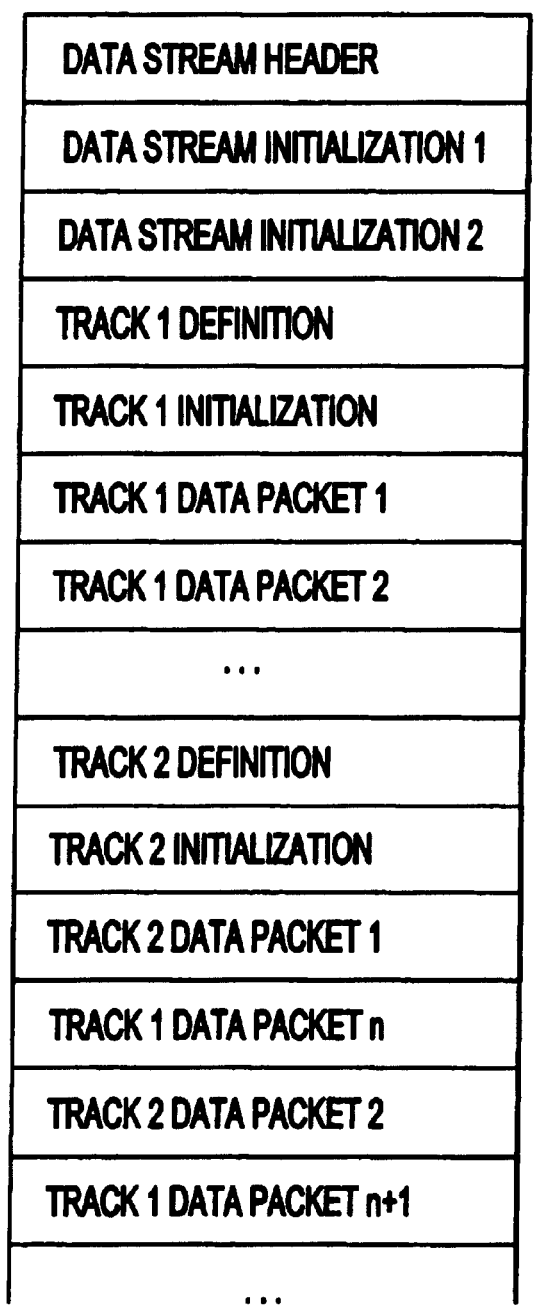
FIG. 10 provides a representative structure of a transmission comprising a sequence of data packets which have been re-ordered in accordance with the present invention

The representative structure of a sequence of data packets which have been re-ordered in accordance with the present invention is shown in FIG. 10. The diagram shows a temporal sequence of data packets with time advancing from the top to the bottom of the figure. The first packet will always be a Data Stream Header packet which identifies the transmission as a particular data stream. The Data Stream Header packet is followed by one or more Data Stream Initialization packets. This example shows two such packets, but the actual number may be greater or lesser depending upon the requirements of the client data stream player.

The Data Stream Initialization packets are followed by a Track Definition packet for "Track 1", where "Track 1" represents the track whose data must be delivered first according to the arrived-upon packet delivery schedule. The Track Definition packet is followed by a Track Initialization packet for Track 1 and then by one or more Data Packets for Track 1.

Prior to the introduction of any (i.e., the first) Data Packet from Track 2, a Track Definition packet and Track Initialization packet for Track 2 are each provided. Once the first Data Packet from Track 2 has been included, Data Packets for Track 1 and Track 2 may be interleaved in a manner determined by the packet delivery schedule. Subsequently (although not shown), there may be additional data packets for other media tracks. In each case, the first data packet for any track will be preceded by a track definition packet and track initialization packet for the corresponding track. Thereafter, transmitted data packets may represent interleaved mixtures of all active tracks (i.e., all tracks for which the first data packet has already appeared and the last data packet has not yet been encountered).

As it is currently described, the invention assumes a fixed bandwidth. Given a fixed bandwidth, one must typically assume the lowest possible effective bandwidth over the time period of the multimedia presentation, and the result, obviously, will not be optimal when the actual bandwidth is higher.

Although the invention, as currently described and implemented, is based on the simplifying assumption of a fixed bandwidth, the means provided in this invention may be employed to support a dynamic response to a variable bandwidth, as follows:

(1) Determine an initial communications bandwidth;

(2) Given this initial bandwidth, employ the inventive method to determine an initial packet delivery schedule and initial client buffer sizes;

(3) Retain the list of virtual data packets created in step (500) and maintain an associated Boolean flag with each packet, which flag indicates whether or not the particular packet has yet been sent (with the initialization setting being 'not sent');

(4) Periodically determine a new communications bandwidth (e.g., by measuring actual time required for the client to receive a packet of known size; and (5) If the newly determined bandwidth differs significantly form the previously employed bandwidth, mark the next few packets (in the delivery schedule order) as "sent" and not the identity of the last packet so marked. Then repeat steps 510–550 to determine a new packet delivery schedule without interrupting packet delivery, using only the packets marked as "not sent". Continue delivering packets based on the former schedule until the last packet previously marked as "sent" has been delivered to the client. Then replace the old packet delivery schedule with the new packet delivery schedule and continue with delivery of packets based on the new schedule.

The number of packets which should be marked "sent" and be delivered while a new packet delivery schedule is being determined is, necessarily, based on the time required to calculate the new packet delivery schedule. It is to be noted that the calculation of a new packet delivery schedule could also lead to changes in the client buffer size requirements. Therefore, a few additional new packets may need to be transmitted in order to tell the client to adjust the buffer size accordingly.

Having thus described the invention, what is claimed is:

1. A method for scheduling the delivery of data packets representing one or more media data tracks, said method allowing the data packets to be delivered from a server to a client with a given bandwidth so as to minimize the initial delay required for the client to present the data without interruption, said method including the steps of:

creating a list of virtual data packets representative of all data packets to be scheduled for delivery from the server to the client;

calculating a delivery deadline for each virtual data packet based on the communications bandwidth from the server to the client and a point in time at which the client must act on the data, wherein the delivery deadline for each virtual data packet is calculated as $$t(\text{deadline})=t(\text{start})-(\text{packetsize})/\text{bandwidth}$$

where t(start) is the point in time when the client needs to act on the data contained in the packet, (packetsize) is the number of bytes in the corresponding data packet, and (bandwidth) is the communications bandwidth from the server to the client in bytes per second;

sorting the list of virtual data packets based on the delivery deadlines calculated for each virtual data packet, to provide a sorted list; and delivering the data packets in accordance with the sorted list.

2. The method claim 1 further comprising:

resolving temporal collisions between virtual data packets.

3. The method of claim 2, wherein the step of resolving temporal collisions is accomplished by comparing each virtual data packet in the sorted list of virtual data packets to the preceding member of this list, starting with the member of this list having the latest delivery deadline and ending with the member of this list having the earliest delivery deadline.

4. The method of claim 1, said method including an additional step for removing temporal gaps between successive virtual data packets.

5. The method of claim 4, wherein the step of removing temporal gaps is accomplished by comparing each virtual data packet in the sorted list of virtual data packets to the next successive member of this list, starting with a first member of the list having the earliest delivery deadline and ending with a last member of this list having the latest delivery deadline.

6. The method of claim 1 further comprising the steps of:

determining optimal client buffer size based on the communications bandwidth; and communicating optimal client buffer size information to the client.

7. The method of claim 1 wherein the communications bandwidth varies, further comprising the steps of:

determining a new communications bandwidth;

calculating a revised sorted list based on the new communications bandwidth;

replacing the sorted list with the revised sorted list; and continuing delivery of packets according to the revised sorted list.

8. The method of claim 7 further comprising the steps of:

determining optimal client buffer size based on the new communications bandwidth; and communicating the optimal client buffer size to the client.

9. A method for interleaving the data packets representing two or more media data tracks, said method allowing the data packets to be delivered from a server to a client with a given bandwidth so as to minimize the initial delay required for the client to present the data without interruption, said method including the steps of:

creating a list of virtual data packets representative of all data packets to be scheduled for delivery from the server to the client;

calculating delivery deadlines for each virtual data packet based on the communications bandwidth from the server to the client and a point in time at which the client must act on the data, wherein the delivery deadline for each virtual data packet is calculated as $$t(\text{deadline})=t(\text{start})-(\text{packetsize})/(\text{bandwidth})$$

where t(start) is the point in time when the client needs to act on the data contained in the packet, (packetsize) is the number of bytes in the corresponding data packet, and (bandwidth) is the communications bandwidth from the server to the client in bytes per second;

sorting the list of virtual data packets into a sorted list based on the delivery deadlines calculated for each virtual data packet; and delivering non-sequential data packets based on said sorted list.

10. The method of claim 9 further comprising:

resolving temporal collisions between virtual data packets.

11. The method of claim 10, wherein the step of resolving temporal collisions is accomplished by comparing each virtual data packet in the sorted list of virtual data packets to the preceding member of this list, starting with the last member of this list having the latest delivery deadline and ending with the first member of this list having the earliest delivery deadline.

12. The method of claim 9, said method including an additional step for removing temporal gaps between successive virtual data packets.

13. The method of claim 12, wherein the step of removing temporal gaps is accomplished by comparing each virtual data packet in the sorted list of virtual data packets to the next successive member of this list, starting with the first member of this list having the earliest delivery deadline and ending with the last member of this list having the latest delivery deadline.

14. A method for determining the minimal initial delay required to deliver a sequence of data packets representing one or more media data tracks from a server to a client without interruption for a given bandwidth, said method including the steps of:

creating a list of virtual data packets representative of all data packets to be scheduled for delivery from the server to the client;

calculating delivery deadlines for each virtual data packet based on the communications bandwidth from the server to the client and a point in time at which the client must act on the data, wherein the delivery deadline for each virtual data packet is calculated as $$t(\text{deadline}) = t(\text{start}) - (\text{packetsize})/(\text{bandwidth})$$

where t(start) is the point in time when the client needs to act on the data contained in the packet, (packetsize) is the number of bytes in the corresponding data packet, and (bandwidth) is the communications bandwidth from the server to the client in bytes per second;

sorting the list of virtual data packets based on the delivery deadlines calculated for each virtual data packet into a sorted list; and calculating the initial delay based on the size of the first data packet on said sorted list.

15. The method of claim 14 further comprising:

resolving temporal collisions between virtual data packets.

16. The method of claim 15, wherein the step of resolving temporal collisions is accomplished by comparing each virtual data packet in the sorted list of virtual data packets to the preceding member of this list, starting with the last member of this list having the latest delivery deadline and ending with the first member of this list having the earliest delivery deadline.

17. The method of claim 14, wherein the minimum initial delay is determined by −t (deadline) for the first member of the sorted list of virtual data packets having the earliest delivery deadline.

18. A method for determining the minimum size of each media data buffer required by a client to allow the client to receive a sequence of data packets representing one or more media data tracks from a server without interruption for a given bandwidth, said method including the steps of:

creating a list of virtual data packets representative of all data packets to be scheduled for delivery from the server to the client;

calculating delivery deadlines for each virtual data packet based on the communications bandwidth from the server to the client and a point in time at which the client must act on the data, wherein the delivery deadline for each virtual data packet is calculated as $$t(\text{deadline}) = t(\text{start}) - (\text{packetsize})/(\text{bandwidth})$$

where t(start) is the point in time when the client needs to act on the data contained in the packet, (packetsize) is the number of bytes in the corresponding data packet, and (bandwidth) is the communications bandwidth from the server to the client in bytes per second;

sorting the list of virtual data packets based on the delivery deadlines calculated for each virtual data packet into a sorted list; and determining the maximum amount of data to be stored in the buffer as a function of time based the size of the virtual data packets and the delivery schedule from said sorted list; and identifying said minimum buffer size based on said maximum amount of data to be stored.

19. The method of claim 18 further comprising:

resolving temporal collisions between virtual data packets.

20. The method of claim 19, wherein the step of resolving temporal collisions is accomplished by comparing each virtual data packet in the sorted list of virtual data packets to the preceding member of this list, starting with the last member of this list having the latest delivery deadline and ending with the first member of this list having the earliest delivery deadline.

21. The method of claim 18, wherein the step of resolving temporal collisions is followed by an additional step for removing temporal gaps between successive virtual data packets.

22. The method of claim 21, wherein the step of removing temporal gaps is accomplished by comparing each virtual data packet in the sorted list of virtual data packets to the following member of this list, starting with the first member of this list having the earliest delivery deadline and ending with the last member of the list having the latest delivery deadline.

23. A server-based system for scheduling the delivery of data packets representing one or more media data tracks and for thereby allowing the data packets to be delivered from the server to a client with a given bandwidth so as to minimize the initial delay required for the client to present the data without interruption, comprising:

at least one media database for storing multimedia data packets;

at least one media delivery component for delivering data packets; and at least one ordering component for ordering the multimedia data into data packages for delivery, wherein said at least one ordering component comprises:

at least one virtual packet list component for creating a list of virtual data packets representative of all data packets to be scheduled for delivery from the server to the client;

at least one calculating component for calculating a delivery deadline for each virtual data packet based on the communications bandwidth from the server to the client and a point in time at which the client must act on the data, wherein the delivery deadline for each virtual data packet are calculated as $$t(deadline) = t(start) - (packetsize)/(bandwidth)$$

where t(start) is the point in time when the client needs to act on the data contained in the packet, (packetsize is the number of bytes in the corresponding data packet, and (bandwidth) is the communications bandwidth from the server to the client in bytes per second;

and at least one sorting component for sorting the list of virtual data packets based on the delivery deadlines calculated for each virtual data packet, to provide a sorted list.

24. A program storage device readable by machine, tangibly embodying a program of instructions executable by the machine to perform method steps for scheduling the delivery of data packets representing one or more media data tracks, said method allowing the data packets to be delivered from a server to a client with a given bandwidth so as to minimize the initial delay required for the client to present the data without interruption, said method including the steps of:

creating a list of virtual data packets representative of all data packets to be scheduled for delivery from the server to the client;

calculating a delivery deadline for each virtual data packet based on the communications bandwidth from the server to the client and a point in time at which the client must act on the data, wherein the delivery deadline for each virtual data packet are calculated as $$t(deadline) = t(start) - (packetsize)/(bandwidth)$$

where t(start) is the point in time when the client needs to act on the data contained in the packet (packetsize) is the number of bytes in the corresponding data packet, and (bandwidth) is the communications bandwidth from the server to the client in bytes per second; and sorting the list of virtual data packets based on the delivery deadlines calculated for each virtual data packet, to provide a sorted list.

* * * * *